July 12, 1949.　　　M. W. BLOOM ET AL　　　2,476,177
FORAGE HARVESTER KNIFE SHARPENER
Filed Oct. 18, 1945　　　　　　　　　　　　2 Sheets-Sheet 1

Inventors
Merle W. Bloom
Paul A. Whisler
by K. S. Wyman
Attorney

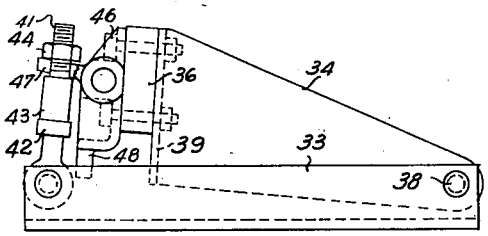
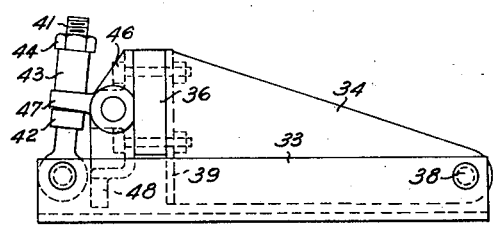
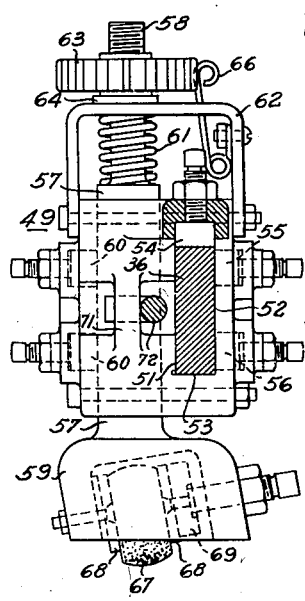
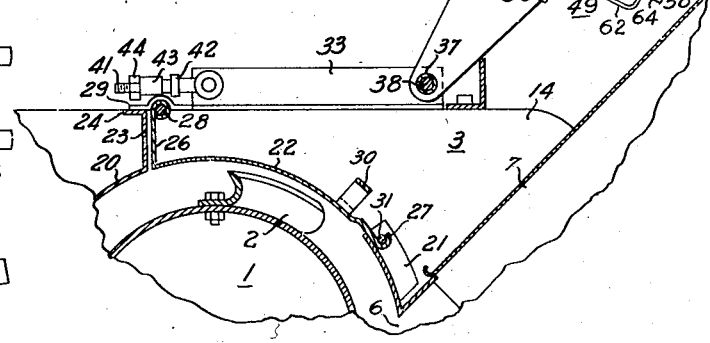
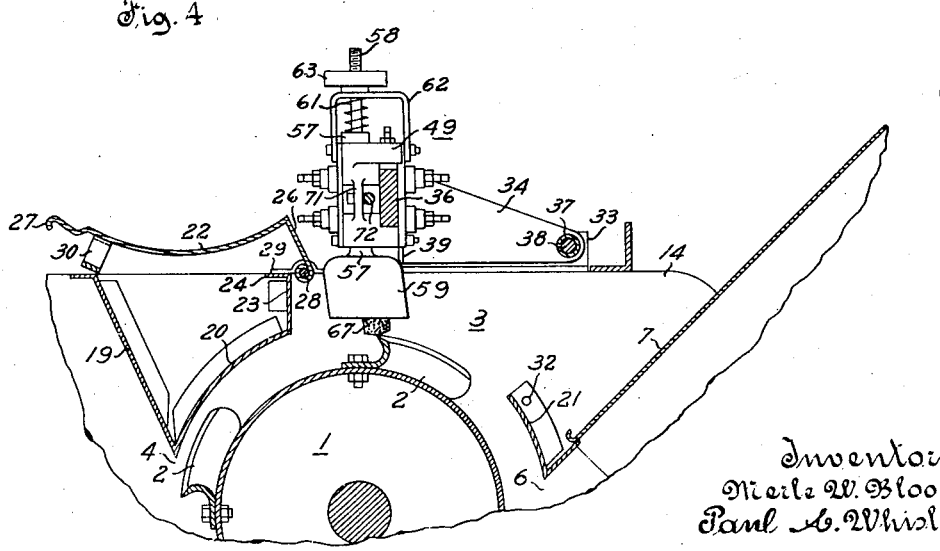

Patented July 12, 1949

2,476,177

UNITED STATES PATENT OFFICE 2,476,177

FORAGE HARVESTER KNIFE SHARPENER

Merle W. Bloom, Maywood, Ill., and Paul A. Whisler, La Porte, Ind., assignors to Allis-Chalmers Manufacturing Company, Milwaukee, Wis., a corporation of Delaware Application October 18, 1945, Serial No. 623,064

5 Claims. (Cl. 51—249)

This invention relates generally to machines such as forage harvesters, ensilage cutters and the like, and has for its object the provision of an improved apparatus for maintaining the cutting elements of such machines conditioned for effective operation.

More particularly, the present invention is directed toward and contemplates the provision of apparatus combinable with the casing-enclosed, rotor mounted cutting elements of such machines, and preferably as a permanent part of the machine, so as to afford a durable, readily accessible and easily manipulated means for quickly and safely sharpening the rotor mounted cutting elements while power is being supplied thereto.

In this connection, the construction, application and operation of apparatus embodying the invention, and the advantages afforded thereby, will become readily apparent as the disclosure progresses and particularly points out additional objects, features of construction and combinations of elements and parts considered of special importance.

And accordingly the invention may be considered as consisting of the various combinations of elements and parts constructed and/or correlated as is more fully set forth in the detailed description and in the appended claims, reference being had to the accompanying drawings illustrating an embodiment of the invention and in which:

Fig. 3 is an enlarged view showing one of the means for holding the sharpener positioned as shown in Figs. 1 and 2;

Fig. 4 is an enlarged view of the reciprocable blade sharpener;

Fig. 5 is a partial section similar to Fig. 1 showing the sharpener shifted to a position permitting the casing cover to be opened;

Fig. 6 is a view similar to Fig. 1 showing the sharpener positioned for and operatively associated with a rotor mounted blade; and Fig. 7 is a view similar to Fig. 3 showing the manner of applying the holding means to the sharpener when positioned as shown in Fig. 6.

Figure 2:
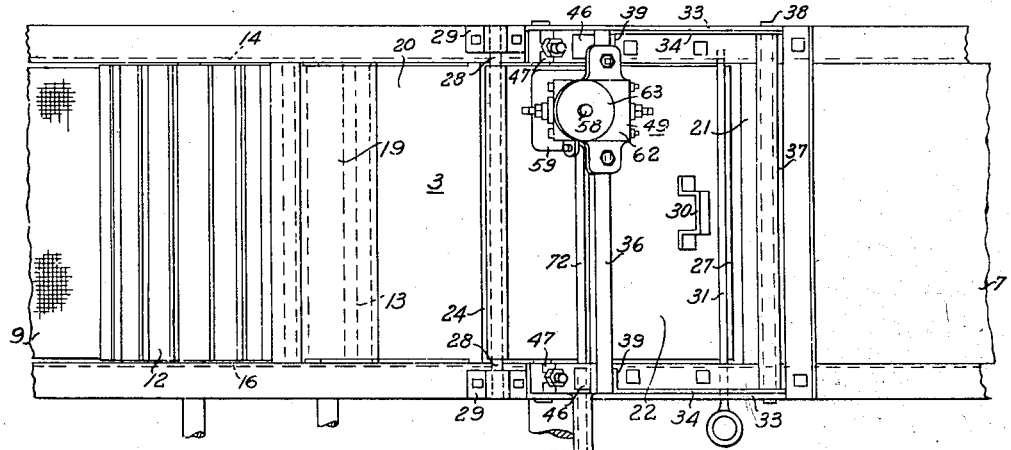
Fig. 2 is a plan view of the structure shown in Fig. 1.
Figure 1:
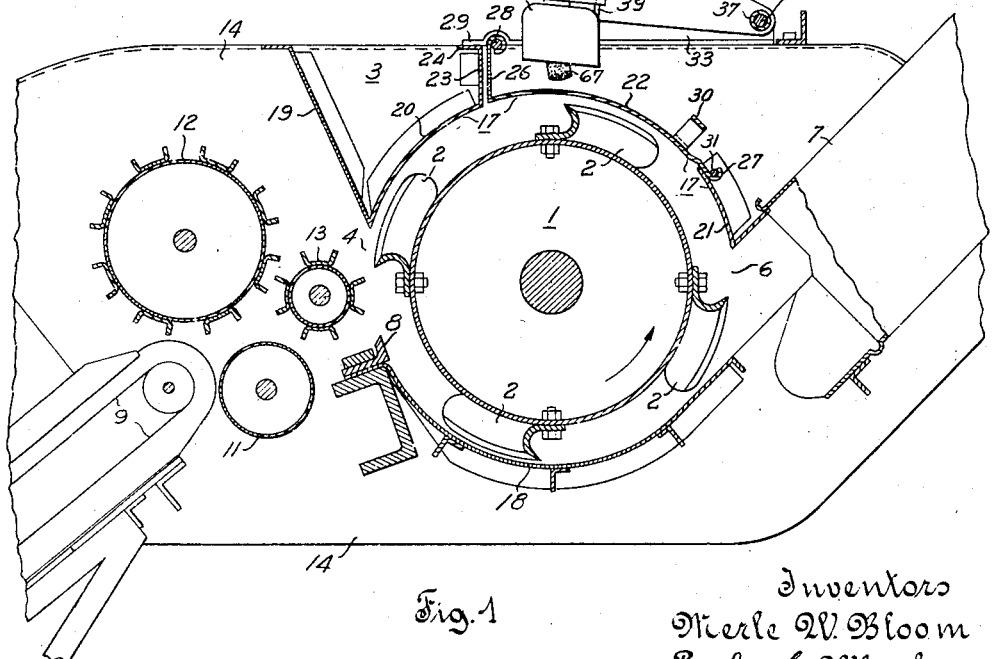
Fig. 1 is a longitudinal section through a part of a forage harvester embodying the invention.

Referring particularly to Figs. 1 and 2 of the drawings, it is seen that for purposes of illustration the invention is shown as applied to a forage chopping or reducing machine of the type embodying a rotor 1 provided with a series of circumferentially spaced material severing and conveying blades 2, a casing structure 3 enclosing the rotor 1 and having therein a pair of circumferentially spaced material receiving and discharging openings 4 and 6, respectively, a conventional spout structure 7 enclosing discharge opening 6 and extending generally tangentially away from the casing structure 3 in the direction of rotor rotation, a shear bar 8 disposed adjacent material receiving opening 4 for severing coaction with the sharpened outer edges of the rotor mounted blades 2, and a conventional material feeding mechanism comprising an elevating conveyor 9 and a plurality of feed rolls 11, 12 and 13 operatively associated with the discharge end of conveyor 9, with the shear bar 8, and with the material receiving opening 4.

In general, the various elements and parts hereinbefore described are constructed and combined for coaction in a known manner. And in this connection, it is to be understood that the rotor 1, the rotating parts of the conveyor 9, and the feed rolls 11, 12 and 13 are operatively mounted and driven in a known manner by means of conventional bearing supports and by means of conventional driving connections with a suitable source of power (all not shown in the interest of simplicity), and that the casing 3 may be in turn suitably mounted on any desired form of supporting structure. Consequently, a further and more detailed description of the coaction and mounting of such elements and parts is deemed unnecessary for a complete understanding of the present invention.

The casing structure 3 comprises a pair of spaced parallel end walls 14 and 16 rigidly interconnected by means of upper and lower arcuate walls 17 and 18, respectively, circumferentially spaced apart to provide the material receiving and discharging openings 4 and 6, respectively, and by a material diverting wall 19 which extends upward and forward from the receiving opening edge of arcuate wall 17 and terminates in an outwardly flanged upper edge substantially flush with the outwardly flanged top edges of the end walls 14 and 16 as is best shown in Figs. 1 and 6 The end walls 14 and 16 extend a considerable distance above the top surface of arcuate wall 17, and the latter comprises a pair of circumferentially spaced, rigid front and rear sections 2 and 21 and an arcuate cover element 22 for closing the gap therebetween.

The rear edge of section 20 terminates in vertical wall portion 23 which in turn terminat in a forwardly extending flange 24 substantial flush with the flanged top edges of end walls 14 and 16. The forward edge of cover element 22 is also provided with a vertical wall portion 26 adapted to abut the wall portion 23 presented by section 20, and the rear edge portion of the cover element is offset so as to closely overlie the adjacent edge portion of rear section 21 and is provided with an upturned lip 27. The upper edge portion of vertical wall 26 of cover element 22 is shaped to receive and retain a hinge pin 28 which extends therethrough with its opposite ends mounted in superimposed relation on the flanged top edges of end walls 14 and 16 by means of hinge-pin straps 29. Cover element 22 is retained in its gap closing position, shown in Fig. 1, by means of a rod 31 which extends through aligned openings 32 in end walls 14 and 16 (see Fig. 6) and in overlying engaged relation with respect to upturned lip portion 27. And with the construction thus far described, it should be obvious that the cover element 22 may be readily selectively positioned either as shown in Fig. 1 or as shown in Fig. 6; the top surface of the cover element being preferably provided with a handle projection 30 as shown.

The flanged top edges of side walls 14 and 16 have rigidly secured thereto a pair of opposed angle members 33 which in turn provide a fixed support for a generally rectangular rigid frame structure comprising a pair of similar side members 34 interconnected in spaced parallel relation by means of a pair of spaced cross members 36 and 37 united with opposed end portions of the side members. Cross member 37 is of tubular form, and a rigid rod 38 extends therethrough and has its opposite ends fixedly secured to opposed end portions of angle members 33 thus mounting the rigid frame structure for pivotal movement about a transverse axis disposed in vertically spaced overlying relation with respect to the forward edge portion of rear section 21 and in generally parallel relation with respect to the axis of rotor 1.

Cross member 36 is rectangular in cross section and is detachably secured in side-abutting relation against inwardly extending opposed flanges 39 (see Figs. 3 and 7) presented by the forward ends of side members 34. The forward end of each angle member 33 is provided with a pivotally mounted bolt-like element 41 presenting a fixed shoulder part 42, and having thereon a tubular spacer 43 and a nut 44. And a pair of brackets 46 are detachably secured to opposite end portions of cross member 36, and each bracket presents a forwardly facing bifurcated lug or projection 47 adapted to receive therebetween the shank portion of bolt-like element 41 with the spacer 43 thereon disposed either above or below lug 47 as is clearly indicated in Figs. 3 and 7. Each bracket 46 is preferably provided with an offset depending projection 48 disposed in superposed relation with respect to the base portion of underlying angle member 33 when the frame structure is positioned as shown in Fig. 7.

Cross member 36 also supports a sharpening device comprising a hollow body structure 49 which is mounted for guided reciprocation longitudinally of member 36 by means of an opening therethrough for the cross member defined in part by fixed guide surfaces 51, 52 and 53, and in part by adjustable pads 54, 55 and 56. Body structure 49 also has a vertically extending opening therethrough in which is slidably mounted a post-like member 57 having an upper end portion 58 of reduced diameter and having an enlarged hollow open-ended lower portion 59. And a lateral movement or wabbling of post-like member 57 may be readily prevented through the use of vertically spaced, adjustable guide pads 60.

The reduced end portion 58 of post-like member 57 extends through a coiled compression spring 61 and through an aligned opening in a fixed, inverted U-shaped bracket 62, and is externally threaded and provided with a serrated adjusting nut 63 and with a washer 64 interposed between nut 63 and the top surface of bracket 62. Spring 61 effects a downward bias on member 57 and thus tends to yieldably maintain the nut and washer combination thereon in engagement with the top surface of bracket 62. A vertical adjustment of member 57 can be readily effected simply by turning nut 63 as desired. And a means such as a spring latch 66 is preferably provided so as to retain nut 63 in a selected position. The cavity presented by the enlarged hollow lower portion of post-like member 57 has a knife sharpening stone 67 removably mounted therein by means of a pair of cushion plates 68 adapted to abut opposite side surfaces of the stone and by means of an adjustable clamping plate 69 positionable to abut one of the cushion plates 68 as shown in Fig. 4.

Body structure 49 is also provided with an eye-forming part 71 in which is disposed the hooked end of a rod 72 which extends away from body structure 49 in generally parallel relation with respect to cross member 36 and through a tubular guide bearing 73 (see Fig. 2) carried by one of the brackets 46. The outer end of rod 72 is shaped to provide a handle 74, and all that has to be done in order to move the sharpening device back and forth along cross member 36 is for the operator to grasp handle 74 and push and pull rod 72 as desired.

During operation of the machine to reduce forage, cover element 22 is disposed in its rotor enclosing position shown in Fig. 1 (it should be secured in such position by inserting rod 31 as indicated) and the sharpening device is positioned and secured in superposed relation thereto (see also Fig. 3) thus preventing the cover element from being opened without first swinging the sharpening device to some such position as shown in Fig. 5. And whenever it is desired to resharpen the blades 2 of rotor 1, all that has to be done is to loosen the nuts 44 on bolt-like elements 41, swing elements 41 from engagement with the bifurcated projections 47 on brackets 46, swing the sharpening device to the position shown in Fig. 5, withdraw rod 31 from engagement with the lip portion 27 of cover element 22 and swing same to the position shown in Fig. 6, swing the sharpening device to the position shown in Fig. 6 and secure same in such position through the coaction of bolt-like member 41 and bracket projections 47 (see Fig. 7), adjust post-like member 57, if necessary, to position stone 67 in sharpening relation with respect to the blades 2, and to grasp the handle 74 of rod 72 and move the body structure 49 and thereby stone 67 back and forth along cross member 36 while revolving rotor 1. When resharpening of the blades has been completed, the sharpening device and cover element are successively shifted to reestablish the relation shown in Figs. 1 and 2, and are then secured in such relation by reinserting rod 31 as indicated and by reengaging bolt-like elements 41 with the bifurcated projections 47 of brackets 46 as shown in Fig. 3.

The herein described constructions and combinations of elements and parts provide an extremely durable and simplified apparatus which permits the power driven revolving knives of forage reducing machines to be readily and quickly resharpened while the machine is in the field or other selected place of operation, without hazard of injury to the operator.

And although the invention is shown as applied to a rotary cutter of the type disclosed and claimed in co-pending application, C. E. Frudden, Serial No. 619,633, filed October 1, 1945, now Patent No. 2,450,277, dated September 28, 1948, it should be understood that it is not intended to limit the invention to the exact construction and combinations of elements and parts herein shown and described for purposes of illustration as various modifications within the scope of the appended claims may occur to persons skilled in the art.

It is claimed and desired to secure by Letters Patent:

1. In combination, a machine embodying a power driven cutting element, a casing structure enclosing said element and provided with an opening exposing a portion of said cutting element, a cover member movably mounted on parts carried by said machine and disposed in adjacent relation to one side of said opening, said cover member being movable toward or away from the opposite side thereof and into a selected one of two positions either covering or exposing said opening, and a sharpening device pivoted on said machine in position adjacent said opposite side of said opening and being selectively movable toward or away from said one side thereof whenever said cover member is disposed in a position either covering or exposing said opening, said device being positionable in sharpening relation to said cutting element whenever said cover member is in a position exposing said opening and being positionable in juxtarelation to said cover member whenever the latter is in a position covering said opening, said juxtarelation affording a coaction between parts of said device and cover member effective to prevent a movement of the latter to a position exposing said opening.

2. In combination, a machine embodying a power driven cutting element, a casing structure enclosing said element and provided with an opening exposing a portion of said cutting element, a cover member pivoted on said machine in position adjacent one side of said opening for movement toward or away from the opposite side thereof and into a selected one of two positions either covering or exposing said opening, and a sharpening device pivoted on said machine in position adjacent said opposite side of said opening and being selectively movable toward or away from said one side thereof whenever said cover member is disposed in a position either covering or exposing said opening, said device being positionable in sharpening relation to said cutting element whenever said cover member is in a position exposing said opening and being positionable in juxtarelation to said cover member whenever the latter is in a position covering said opening, said juxtarelation affording a coaction between parts of said device and cover member effective to prevent a movement of the latter to a position exposing said opening.

3. In combination, a machine embodying a power driven rotary element presenting a series of circumferentially spaced cutting edges extending generally longitudinally with respect to its axis of rotation, a casing structure enclosing said element, and provided with an opening for exposing the cutting edges of the element as they travel past said opening, a cover member pivoted on one side of said opening and selectively positionable to cover or expose said opening, a frame structure including a rigid guide bar and a sharpening part mounted on said bar, and means pivotally mounting said frame structure on said machine for swinging movement about an axis disposed adjacent the opposite side of said opening and generally parallel with respect to the axis of rotation of said element, said frame structure being swingable into a position placing said sharpening part in engagement with said cutting edges whenever said cover member is positioned to expose said opening, and being swingable into a superposed relation to said member when the latter is in a position covering said opening, said superposed relation affording a coaction between said sharpening part and said cover member effective to prevent the latter being swung to a position exposing said opening.

4. In combination, a machine embodying a power driven cutting element, a casing structure enclosing said element and provided with an opening for exposing a portion of the cutting edge of said element, a cover member carried by said machine in adjacent relation with respect to said opening, and a sharpening device carried by said machine in adjacent relation with respect to said opening and with respect to said cover member, said machine including parts mounting said cover member and sharpening device for relative swinging movement about separate generally parallel pivot axes disposed in overlying adjacent relation with respect to opposite sides of said opening, said cover member being swingable about its axis and into positions either covering or exposing said opening provided said device has been swung to a position clear of said opening, and said device being swingable into sharpening relation to said cutting edge whenever said cover member is positioned to expose said opening and being swingable into a superposed relation to said cover member whenever the latter is positioned to cover said opening, said superposed relation affording a coaction between parts of said device and cover member effective to prevent the latter being swung to a position exposing said opening.

5. In a machine, comprising a power driven cutting element, a casing structure enclosing said element and including spaced side sections united by an intermediate section disposed below the top edges of said side sections, said intermediate section being provided with an opening exposing a portion of the cutting edge of said element, a cover member mounted on said casing structure for movement relative thereto into and out of positions covering or exposing said opening, and a device for sharpening the cutting edge of said element comprising a frame structure including a pair of side members rigidly united by a pair of spaced generally parallel cross members, one of said cross members having opposite end portions thereof pivotally supported on generally opposite top edge portions of said casing side sections and affording swinging movement of said frame structure into and out of a position between said side members and in proximate superposed relation to said opening, a sharpening part secured to a carrier mounted on the other of said pair of cross members for guided reciprocation longitudinally thereof, said device being swingable into sharpening relation to said cutting edge whenever said cover member is positioned to expose said opening, and being swingable into a superposed relation to said cover member whenever the latter is positioned to cover said opening, said superposed relation affording a coaction between said sharpening part and cover member effective to prevent said cover member being swung to a position exposing said opening.

MERLE W. BLOOM.
PAUL A. WHISLER.

REFERENCES CITED

The following references are of record in the file of this patent:

UNITED STATES PATENTS

| Number | Name | Date |
|---|---|---|
| 1,136,594 | Fosterling | Apr. 20, 1915 |
| 2,005,551 | MacDonald | June 18, 1935 |
| 2,141,055 | Van Barkel | Dec. 20, 1938 |

FOREIGN PATENTS

| Number | Country | Date |
|---|---|---|
| 458,528 | Great Britain | Dec. 22, 1936 |